US 8,177,680 B2

(12) United States Patent
Shibata et al.

(10) Patent No.: US 8,177,680 B2
(45) Date of Patent: May 15, 2012

(54) CONTROLLER OF VEHICLE DRIVING DEVICE (75) Inventors: Hiroyuki Shibata, Toyota (JP); Tooru Matsubara, Toyota (JP); Takashi Ohta, Toyota (JP); Hideaki Komada, Gotenba (JP); Yukihiko Ideshio, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1062 days.

(21) Appl. No.: 12/090,773

(22) PCT Filed: Oct. 26, 2006

(86) PCT No.: PCT/JP2006/321341
§ 371 (c)(1),
(2), (4) Date: Apr. 18, 2008

(87) PCT Pub. No.: WO2007/049678
PCT Pub. Date: May 3, 2007

(65) Prior Publication Data
US 2009/0137360 A1 May 28, 2009

(30) Foreign Application Priority Data

Oct. 26, 2005 (JP) ................................. 2005-312059

(51) Int. Cl.
*B60K 1/02* (2006.01)
*F16H 59/00* (2006.01)
*F16H 3/72* (2006.01)
*G06F 7/00* (2006.01)

(52) U.S. Cl. ...................... 477/3; 477/98; 475/5; 701/51

(58) Field of Classification Search ................. 477/3, 98; 475/5; 701/51, 53, 58, 60
See application file for complete search history.

(56) References Cited

U.S. PATENT DOCUMENTS 5,791,427 A * 8/1998 Yamaguchi .............. 180/65.235
(Continued)

FOREIGN PATENT DOCUMENTS

JP    58 203255    11/1983
JP    2003 127681    5/2003
(Continued)

OTHER PUBLICATIONS

U.S. Appl. No. 12/090,901, filed Apr. 21, 2008, Tabata, et al.

*Primary Examiner* — J. Allen Shriver, II
*Assistant Examiner* — James M Dolak
(74) *Attorney, Agent, or Firm* — Oblon, Spivak, McClelland, Maier & Neustadt, L.L.P.

(57) ABSTRACT

A drive unit control system having a continuously variable speed change (CV) unit and a geared speed change (geared) unit to execute a manual speed change to apply responsive engine brake and sufficient braking force. A speed change mode is selected from first and second modes, where a total speed change ratio governed by the speed change ratio of the CV unit and the gear stage of the geared unit is set based on a vehicle running condition, and the total speed change ratio is set based on a signal for applying power source braking, respectively. The system reduces a number of gear stages of the geared unit settable under the second mode. Total speed change ratio is set according to the gear stage of the geared unit, and to the speed change ratio of the CV unit, in case the second mode is selected.

18 Claims, 7 Drawing Sheets

U.S. PATENT DOCUMENTS

| | | | | |
|---|---|---|---|---|
| 6,048,289 | A * | 4/2000 | Hattori et al. | 477/15 |
| 6,336,888 | B1 * | 1/2002 | Eguchi | 477/3 |
| 6,377,883 | B1 * | 4/2002 | Shimabukuro et al. | 701/51 |
| 6,494,809 | B1 * | 12/2002 | Suzuki et al. | 477/107 |
| 6,506,139 | B2 * | 1/2003 | Hirt et al. | 477/3 |
| 6,647,326 | B2 * | 11/2003 | Nakamori et al. | 701/22 |
| 6,666,793 | B2 * | 12/2003 | Narita et al. | 477/40 |
| 6,715,572 | B2 * | 4/2004 | Shimabukuro et al. | 180/65.6 |
| 7,174,979 | B2 * | 2/2007 | Ohta et al. | 180/65.25 |
| 7,223,200 | B2 * | 5/2007 | Kojima et al. | 477/3 |
| 7,548,810 | B2 * | 6/2009 | Aoki | 701/51 |
| 7,822,524 | B2 * | 10/2010 | Tabata et al. | 701/53 |

FOREIGN PATENT DOCUMENTS

| | | |
|---|---|---|
| JP | 2003 294130 | 10/2003 |
| JP | 2004 28279 | 1/2004 |
| JP | 2005 206136 | 8/2005 |
| JP | 2005 256883 | 9/2005 |

* cited by examiner

CONTROLLER OF VEHICLE DRIVING DEVICE

TECHNICAL FIELD

This invention relates to a drive unit of a vehicle having an electrically controlled speed change unit and a mechanically controlled speed change unit, and more particularly, to a system for controlling a speed change ratio of the vehicle.

BACKGROUND ART

This kind of drive unit of a vehicle of is disclosed in Japanese Patent Laid-Open No. 2003-127681. Objectives of the invention disclosed in Japanese Patent Laid-Open No. 2003-127681 is to suppress an increase in size of an electric motor, and to obtain driving force in accordance with a various vehicle speeds. In the hybrid-vehicle drive system taught by Japanese Patent Laid-Open No. 2003-127681, an internal combustion engine is connected with a carrier of a planetary gear mechanism, a first electric motor/generator is connected with a sun gear of the planetary gear mechanism, and a member of an input side of a transmission is connected with a ring gear. The transmission is a geared transmission such as an automatic transmission. A member of an output side of the transmission is connected with a propeller shaft, and a second electric motor/generator is connected with the propeller shaft. Thus, according to this hybrid-vehicle drive system, the planetary gear mechanism constitutes a distribution mechanism for distributing power of the engine to the first electric motor/generator and to the transmission, and a revolution frequency of the ring gear, i.e., an input revolution of the transmission connected with the ring gear is varied continuously by changing a revolution frequency of the first electric motor/generator. That is, the planetary gear mechanism and the first electric motor/generator function as a continuously variable transmission. Therefore, a total speed change ratio of the hybrid-vehicle drive system is governed by a speed change ratio of the planetary gear mechanism functioning as a continuously variable transmission, and a speed change ratio of the transmission placed on the output side of the planetary gear mechanism.

A main objective of a drive unit of a vehicle is to improve fuel economy entirely by carrying out a regeneration of energy, in addition to controlling a speed change ratio. However, not only a good fuel economy and low emission, but also an excellent traveling performance such as a driving performance and a braking ability, and an excellent control response are required for a vehicle. The hybrid-vehicle drive system disclosed in Japanese Patent Laid-Open No. 2003-127681 is capable of improving the fuel economy of the vehicle. However, in the hybrid-vehicle drive system disclosed in Japanese Patent Laid-Open No. 2003-127681, an entire speed change ratio thereof is set by both speed change ratio of the continuously variable transmission unit and a gear stage of the geared transmission. Therefore, in case of increasing the speed change ratio to use an engine brake (or a power source braking), a speed change operation has to be carried out with a switching operation of an engagement device of the geared transmission such as a clutch. For this purpose, an intricate hydraulic control has to be carried out and this causes a delay in the speed change operation. Especially, in case of carrying out a downshifting by a manual operation, such delay in the speed change may bring discomfort.

DISCLOSURE OF THE INVENTION

The present invention has been conceived noting the technical problems thus far described, and its object is to improve a responsiveness of a speed change under a speed change mode of applying a power source braking, in a drive unit of a vehicle having an electrically controlled speed change unit and a mechanically controlled speed change unit.

In order to achieve the above-mentioned object, according to the invention, a speed change of a continuously variable transmission unit is carried out preferentially in case the speed change mode of applying a power source braking is selected. More specifically, the present invention is applied to a control system for a drive unit of a vehicle: which has an electrically controlled speed change unit electrically controlling a speed change ratio thereof governed by an input revolution and an output revolution, and a mechanically controlled speed change unit mechanically changing a gear stage thereof governed by an input revolution and an output revolution; and in which a speed change mode can be selected from a first speed change mode wherein a total speed change ratio governed by the speed change ratio of the electrically controlled speed change unit and the gear stage of the mechanically controlled speed change unit is set on the basis of a running condition of a vehicle, and a second speed change mode wherein the total speed change ratio is set on the basis of a signal for applying a power source braking. According to the invention, the above-mentioned control system for a drive unit of a vehicle is characterized by comprising a gear stage limiting means for reducing number of settable gear stages of the mechanically controlled speed change unit in case the second speed change mode is selected; and characterized in that the total speed change ratio is set according to the gear stage of the mechanically controlled speed change unit set by the gear stage limiting means, and to the speed change ratio of the electrically controlled speed change unit, in case the second speed change mode is selected. The mechanically controlled speed change unit and the electrically controlled speed change unit may be connected in tandem so as to input power outputted from any one of those speed change units to the other one.

According to the control system of the invention, the electrically controlled speed change unit comprises an electric motor having a power generating function, and the gear stage limiting means includes a gear stage selecting means for selecting the gear stage of the mechanically controlled speed change unit to limit thermal load of the electric motor within an allowable range, in case a downshift signal for increasing the total speed change ratio is outputted to apply the power source braking when the second speed change mode is selected.

According to the invention, the control system for a drive unit of a vehicle further comprising: an electric storage device storing mechanical energy resulting from running of the vehicle in the form of electric power; an another electric motor to which the electric power is fed from the electric storage device, and which outputs power for running; a state of charge determining means for determining a state of charge of the electric storage device in case the downshift signal for increasing the total speed change ratio is outputted to apply the power source braking; a charge expediting means for setting a high speed side gear stage of the mechanically controlled speed change unit in case the state of charge determining means determines that a charging capacity of the electric storage device is low; and characterized in that the total speed change ratio is set according to the gear stage of the mechanically controlled speed change unit set by the gear stage limiting means, and to the speed change ratio of the electrically controlled speed change unit, so as to equalize an amount of charge and an amount of discharge of the electric storage device, in case the state of charge determining means determines that the charging capacity is high.

In addition to above, the control system for a drive unit of a vehicle further comprises a temperature detecting means for detecting a temperature of the mechanically controlled speed change unit, and a gear stage restricting means for restricting a predetermined gear stages of the mechanically controlled speed change unit in case the temperature detecting means detects an extremely low temperature of the mechanically controlled speed change unit.

According to the invention, the electrically controlled speed change unit includes a continuously variable transmission mechanism in which a speed change ratio thereof varies continuously, and the mechanically controlled speed change unit includes a geared transmission mechanism in which a gear stage thereof changes stepwise.

Also, the gear stage limiting means includes a means for reducing the number of settable gear stages of the mechanically controlled speed change unit in case the second speed change mode is selected, in comparison with that of the case in which the first speed change mode is selected.

Further, according to the invention, the drive unit includes a hybrid drive unit, which comprises a plurality of prime movers, and in which powers outputted from those prime movers are distributed or synthesized to be outputted.

The electrically controlled speed change unit may be constructed by a gear mechanism capable of performing a differential action, e.g., by a single pinion type planetary gear mechanism and a double pinion type planetary gear mechanism comprising a sun gear, a ring gear and a carrier as its rotary elements. In this case, the carrier can be connected with an engine, the sun gear can be connected with a first electric motor, and the ring gear can be connected with an input shaft of the mechanically controlled speed change unit. Further, a second electric motor can also be connected with the input shaft of the mechanically controlled speed change unit.

Additionally, according to the invention, the mechanically controlled speed change unit may be constructed by any of a plurality of planetary gear mechanisms and a plurality of gear pairs. The mechanically controlled speed change unit may be adapted to set six forward gear stages.

As explained above, according to the invention, the number of gear stages to be set in the mechanically controlled speed change unit is limited to a small number under the second speed change mode where the power source braking is applied. In case of carrying out a speed change to apply a power source breaking under the second speed change mode, the total speed change ratio, i.e., an entire speed change ratio of the drive unit is set by the gear stage of the mechanically controlled speed change unit in which the number of settable gear stages is limited and the speed change ratio of the electrically controlled speed change unit. In this case, the total speed change ratio which cannot be set by the mechanically controlled speed change unit can be set by varying the speed change ratio of the electrically controlled speed change unit. Namely, the speed change operation is carried out by the electrically controlled speed change unit while fixing the gear stage of the mechanically controlled speed change unit. That is, the speed change operation of the electrically controlled speed change unit is carried out preferentially. The speed change operation of the electrically controlled speed change unit is, i.e., a speed change operation to set the speed change ratio thereof to a target value by varying the speed change ratio continuously. This means that the speed change operation of the electrically controlled speed change unit can be executed more quickly in comparison with that of the mechanically controlled speed change unit. As a result, a response of the speed change operation under the speed change mode to apply a power source braking can be improved.

The speed change operation of the electrically controlled speed change unit is carried out by controlling the electric motor, and the thermal load of the electric motor is changed according to the gear stage of the mechanically controlled speed change unit. For this reason, the gear stage of the mechanically controlled speed change unit where the thermal load of the electric motor falls within an allowable range is selected out of the limited gear stages. As a result, the thermal load of the electric motor can be reduced relatively, and the fuel economy and durability of the electric motor can be improved.

If the charging capacity is low, in other words, the amount of charge of the electric storage device is little when applying the power source braking, the high speed side gear stage of the mechanically controlled speed change unit is set. Therefore, an amount of the electric power resulting from running of the vehicle is increased so that a charging of the electric storage device is promoted. To the contrary, in case the charging capacity is high, in other words, the amount of charge of the electric storage device is large, the gear stage and the speed change ratio of individual speed change units are set to consume the electric power resulting from running of the vehicle by said another electric motor. Therefore, the power source braking can be applied sufficiently, and a charging performance can be improved.

According to the invention, moreover, in case the temperature of the mechanically controlled speed change unit is extremely low, the mechanically controlled speed change unit is restricted to shift to the high speed side gear stage. That is, a low speed side gear stage is set in the mechanically controlled speed change unit, and the speed change ratio of the electrically controlled speed change unit is varied to obtain a target total speed change ratio. For this reason, relative revolution speeds of the rotary elements constituting the mechanically controlled speed change unit, or an absolute revolution speed of the mechanically controlled speed change unit is/are increased. Consequently, an oil temperature is raised promptly. Also, a shifting operation to set the low speed side gear stage may be achieved by activating only one frictional engagement device such as a one-way clutch. In this case, the hydraulic control is relatively less affected by viscosity of the oil so that deterioration in shocks can be prevented or minimized.

Further, according to the invention, the above-mentioned advantages can be obtained in a drive unit comprising a continuously variable transmission unit and a geared transmission unit.

Furthermore, according to the invention, since the number of gear stages of the mechanically controlled speed change unit is reduced under the speed change mode to apply power source braking, in comparison with other speed change modes, a response to apply the power source braking can be improved.

Additionally, according to the invention, the above-mentioned advantages can be obtained in a hybrid drive unit.

BEST MODE FOR CARRYING OUT THE INVENTION

Figure 7:
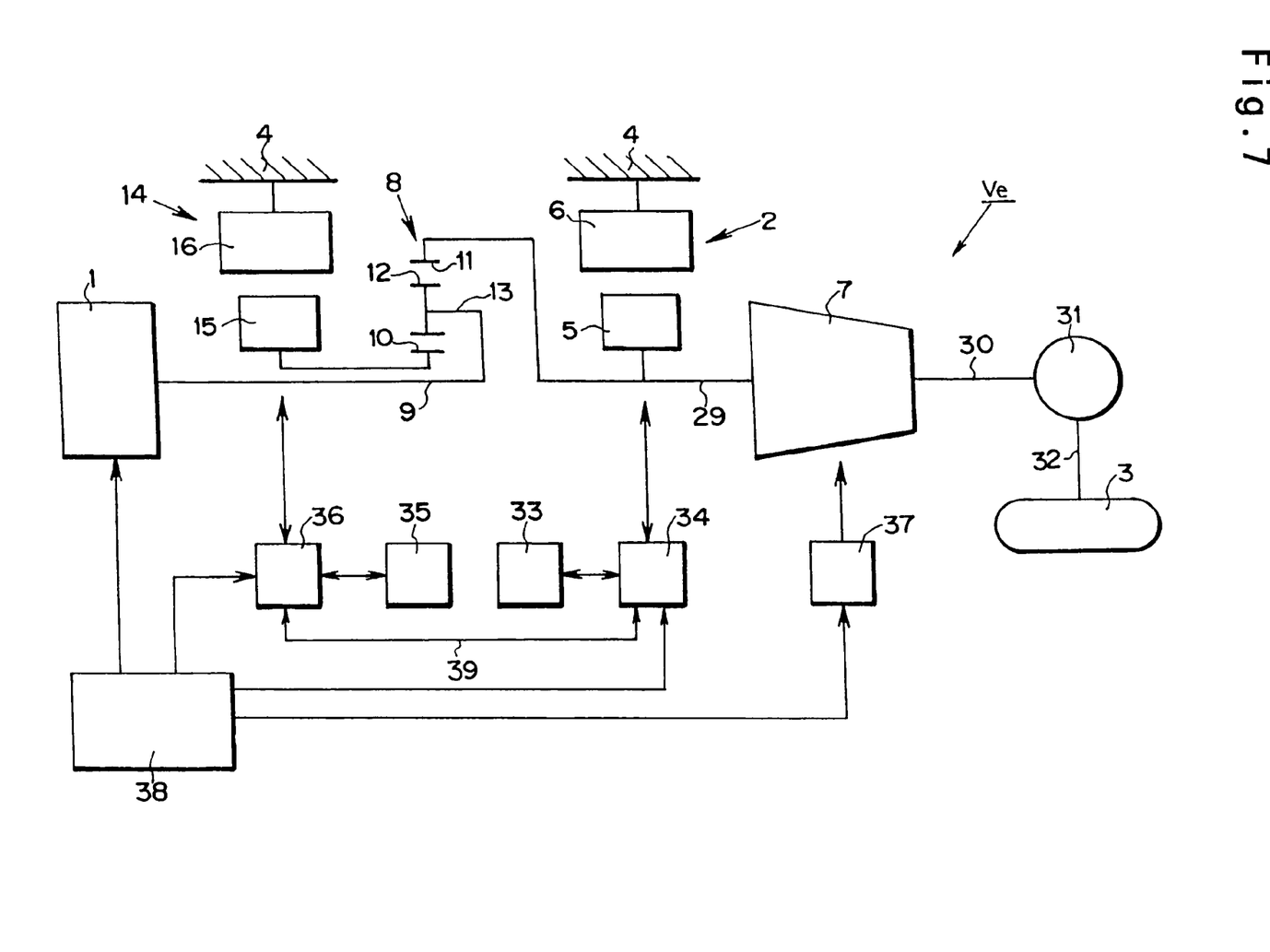
FIG. 7 is a skeleton diagram showing one example of a drive unit of a vehicle to which the invention is applied.

Next, here will be described the present invention in connection with its specific examples. First of all, one example of a drive unit of a vehicle to which a control system of the invention is applied will be explained hereinafter. FIG. 7 shows an example of the control system arranged in an FR (i.e., Front-engine Rear-drive) type hybrid vehicle Ve (as will be called the "vehicle" hereinafter). The drive unit illustrated in FIG. 7 comprises two kinds of prime movers having different principles of power generation. In this example, an engine 1 and a motor generator 2 (MG2) are employed as prime movers, and a power train and a power transmission route are arranged to transmit both powers outputted from the engine 1 and the motor generator 2 commonly to a (rear) wheel 3. The engine 1 functioning as a prime mover of the vehicle Ve is a power unit converting a thermal energy into a kinetic energy by burning a fuel. Both an internal combustion engine and an external combustion engine can be employed as the engine 1, however, here will be explained an example of using an internal combustion engine as the engine 1. The internal combustion engine can be exemplified by a gasoline engine, a diesel engine, an LPG engine and so on. The engine 1 comprises an output control device such as a (not shown) electronic throttle valve, a (not shown) fuel injection device, a (not shown) ignition timing controlling device and so on. Therefore, an engine output can be controlled by controlling at least one of those devices.

On the other hand, the motor generator 2 as an another prime mover is housed in a casing 4, and it functions as a motor converting an electric energy into a kinetic energy, and also functions as a generator converting a kinetic energy into an electric energy. The motor generator 2 comprises a rotor 5 and a stator 6, and the stator 6 is fixed with the casing 4. A transmission 7 is arranged on a power transmission route from the engine 1 and the motor generator 2 to the wheel 3, and a power distribution mechanism 8 is arranged on a power transmission route from the engine 1 to the transmission 7. The power distribution mechanism 8 shown in FIG. 7 is composed mainly of a single pinion type planetary gear mechanism. Specifically, the power distribution mechanism 8 comprises: a sun gear 10, which is arranged coaxially with an output shaft 9 of the engine 1; a ring gear 11, which is arranged coaxially with the sun gear 10; and a carrier 13, which holds a plurality of pinion gears 12 meshing with the sun gear 10 and the ring gear 11 in a rotatable and revolvable manner.

Those sun gear 10, ring gear 11 and carrier 13 are arranged to rotate differentially among each other. Specifically, the carrier 13 and the output shaft 9 are connected in a power transmittable manner, in other words, connected to rotate integrally. Meanwhile, a motor generator (MG1) 14 is arranged between the engine 1 and the power distribution mechanism 8 in the axial direction of the output shaft 9. This motor generator 14 functions as a motor converting an electric energy into a kinetic energy, and also functions as a generator converting a kinetic energy into an electric energy. The motor generator 14 comprises a rotor 15 and a stator 16, and the stator 16 is fixed with the casing 4. The rotor 15 and the sun gear 10 are connected in a power transmittable manner, specifically connected to rotate integrally.

The transmission 7 is capable of changing (i.e., controlling) a speed change ratio obtained by dividing an input revolution by an output revolution. In this example, a mechanically controlled speed change unit or a geared transmission is used as the transmission 7. Specifically, here will be explained an example of using a geared transmission comprising a planetary gear mechanism. In order to switch the power transmission route between the rotary elements constituting the planetary gear mechanism, and to control the rotations and cessations of the rotary elements, the transmission 7 is provided with a frictional engagement device such as a clutch and a brake. Here, both types, i.e., hydraulic and electromagnetic frictional engagement devices may be used, however, a hydraulic frictional engagement device is used in this example. The gear stage of the transmission 7 can be selected within a range from first to sixth stages in a Drive position, and the gear stage is fixed in a Reverse position, by controlling an engagement and a releasing of those frictional engagement devices. In case the Drive position is selected, the gear stage can be changed selectively and stepwise in the six gear stages. Here, the larger gear stage sets the smaller speed change ratio of the transmission 7. Thus, the transmission 7 corresponds to a geared transmission unit (i.e., an AT unit) of the invention.

A rotary member 29 is connected to an input side of the transmission 7, and an output rotary member 30 is connected to an output side of the transmission 7. The other end side of the input rotary member 29 is connected with the ring gear 11 of the power distribution mechanism 8 to rotate integrally therewith, and the rotor 5 of the motor generator 2 is also connected with the input rotary member 29. The output rotary member 30 is a propeller shaft, and it is connected with a (not shown) drive pinion shaft of a differential 31. Also, a drive shaft 32 is connected with a (not shown) side gear of the differential 31 and the wheel 3.

There is provided an electric storage device 33 capable of exchanging electric power with the motor generator 2, and an inverter 34 is arranged on a circuit between the motor generator 2 and the electric storage device 33. Also, there is provided an electric storage device 35 capable of exchanging electric power with the motor generator 14, and an inverter 36 is arranged on a circuit between the motor generator 14 and the electric storage device 35. A secondary battery, more specifically, a battery, a capacitor and so on can be used as the electric storage devices 33 and 35. Further, an electric circuit 39 is formed to connect the inverters 34 and 36 so that the electric power can be exchanged between the electric storage devices 33 and 35, and also between the motor generators 2 and 14 without being routed through the electric storage devices 33 and 35.

In order to control the transmission 7, there is provided a hydraulic control unit 37. For example, the hydraulic control unit 37 performs a control for switching a shift position as exemplified by Drive position, Reverse position, Neutral position, and Manual position, and performs an automatic shifting control of the gear stage of the transmission 7 in case the Drive position is selected. The hydraulic control unit 37 comprises known elements such as a hydraulic circuit, a manual valve, a solenoid valve, a pressure control valve. The hydraulic control unit 37 is adapted to switch the aforementioned shift positions, and to control an engagement and a releasing of the aforementioned frictional engagement devices.

Figure 8:
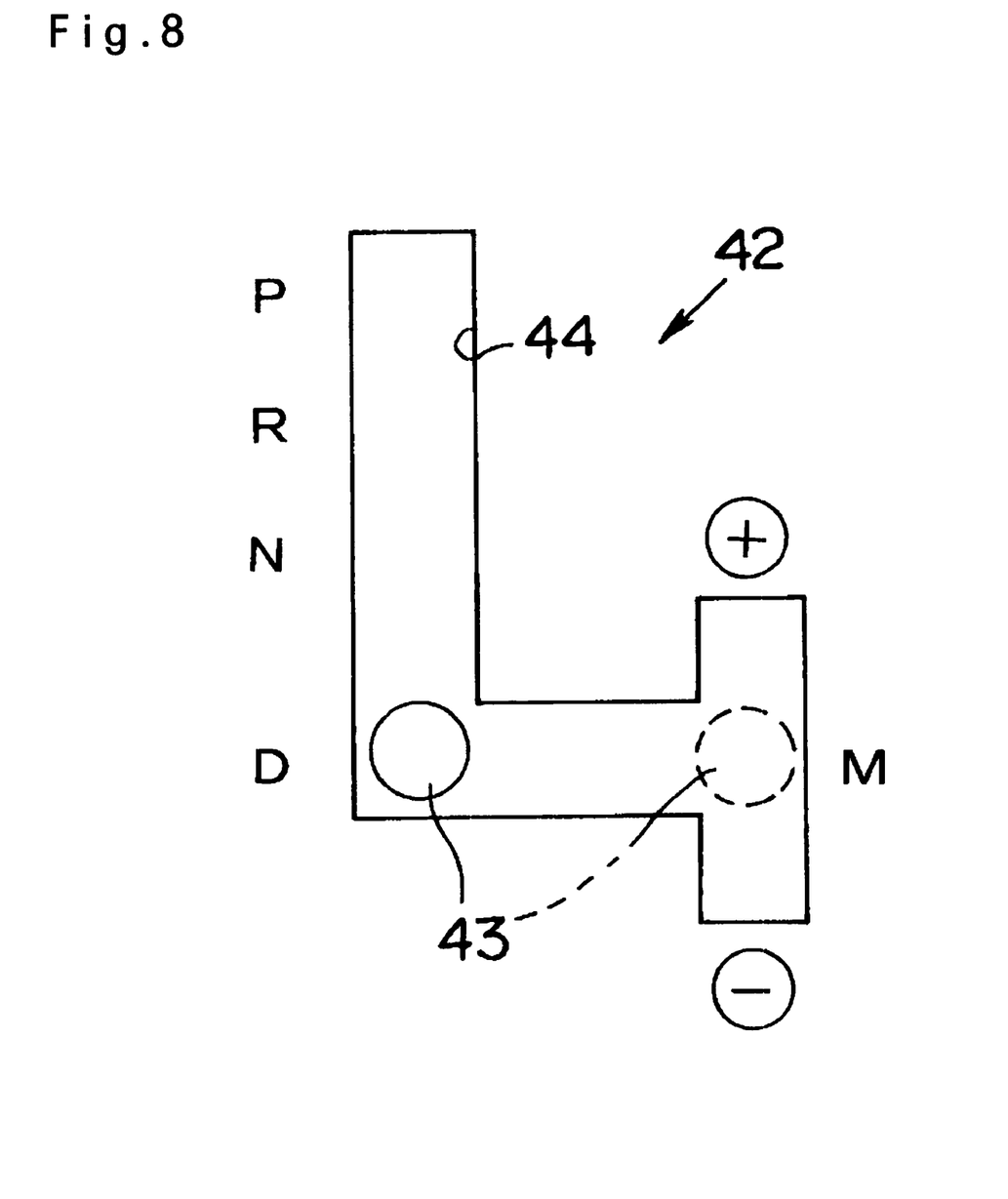
FIG. 8 is a drawing showing an arrangement of shift positions of a shifting device.

Also, there is provided a shifting device 42 for selecting the shift position. FIG. 8 illustrates an arrangement of shift positions in a shifting device 42 connected with an after-mentioned electronic control unit 38. In the shifting device 42, a parking (P) for keeping the vehicle being stopped, a reverse (R), a neutral (N) and a drive (D) positions are arranged linearly in an anteroposterior direction of the vehicle. A manual position (M) is arranged adjacent to the drive position (D) in the width direction of the vehicle, and an upshift position (+) and a downshift position (−) are arranged above and below the manual position. Those shift positions are connected through a guide groove 44 guiding a shift lever 43. That is, the shift position is selected arbitrary by moving the shift lever 43 along the guide groove 44, and the shift position signal of selected position is inputted to the electronic control unit 38.

In case the Drive position is selected, the aforementioned first speed change mode is carried out. On the other hand, in case the shift lever 43 is moved from the manual position to the upshift position or the downshift position, the speed change is carried out under the aforementioned second speed change mode. Specifically, in case the upshift position is selected, a predetermined total speed change ratio, which is smaller than the current total speed change ratio, and which can apply a power source braking is set. To the contrary, in case the downshift position is selected, a predetermined total speed change ratio larger than the current total speed change ratio is set to apply a power source braking.

Next, a control line will be explained hereafter. There is provided an electronic control unit 38, to which signals are inputted from a shift position sensor, a vehicle speed sensor, an acceleration demand detection sensor, a braking demand detection sensor, an engine revolution sensor, a sensor for detecting amounts of charge of the electric storage devices 33 and 35, a sensor for detecting revolutions of the motor generators 2 and 14, a sensor for detecting temperatures of the motor generators 2 and 14, a sensor for detecting revolutions of the input rotary member 29 and the output rotary member 30, a sensor for detecting a gradient of a road on which the vehicle Ve is running, a sensor for detecting an acceleration of the vehicle Ve and so on. On the other hand, a signal for controlling the engine 1, a signal for controlling the motor generators 2 and 14 (or the inverters 34 and 36), a signal for controlling the hydraulic control unit 37 and so on are outputted from the electronic control unit 38.

In the vehicle Ve illustrated in FIG. 7, when the engine 1 is driven so that an engine torque is transmitted to the carrier 13 of the power distribution mechanism 8, a reaction torque is established by the motor generator 14 and the engine torque is transmitted to the ring gear 11. The torque transmitted to the ring gear 11 is then transmitted sequentially to the input rotary member 29, the transmission 7, the output rotary member 30 and the differential 31, thereby driving the wheel 3 eventually. The power distribution mechanism 8 is capable of controlling a speed change ratio between the carrier 13 as the input element and the ring gear 11 as the output element, by the differential action achieved by the sun gear 10, the carrier 13 and the ring gear 11. More specifically, the revolution frequency of the engine 1 can be controlled steplessly (i.e., continuously) by controlling the output of the motor generator 14 establishing the reaction torque. Namely, the power distribution mechanism 8 has a function as an electrical continuously variable transmission (i.e., an electrical CVT unit), and therefore corresponds to the electrically controlled speed change unit of the invention.

Thus, in case of establishing the reaction torque by the motor generator 14, a rotational direction of the motor generator 14 is switched selectively to forward and backward directions, or the motor generator 14 is halted on the basis of a various condition. For example, in case the motor generator 14 is rotated in the forward direction to establish the reaction torque, the motor generator 14 is controlled to function as a generator. The electric power generated by the motor generator 14 can be stored in the electric storage device 35. Alternatively, the electric power generated by the motor generator 14 can be fed to the motor generator 2 through the inverters 34 and 36 to operate the motor generator 2 as a motor. That is, the motor generator 2 is driven as an electric motor, and the torque thereof is transmitted to the wheel 3 through the input rotary member 29, the transmission 7 and the differential 31. To the contrary, in case the motor generator 14 is rotated in the backward direction to establish the reaction torque, the motor generator 14 is controlled to function as a motor. In this case, the electric power can be fed to the motor generator 14 from the electric storage device 35 or the motor generator 2. This means that it is also possible to feed the electric power to the motor generator 14 through the inverters 34 and 36 by using the motor generator 2 as a generator.

Here will be explained a control concept of the speed change ratio of the power distribution mechanism 8. An objective of the control is to improve fuel consumption by controlling a driving condition of the engine 1 and the speed change ratio of the power distribution mechanism 8 cooperatively. For this purpose, a drive demand of the vehicle Ve is obtained for example on the basis of an acceleration demand (i.e., an opening degree of an accelerator) and a vehicle speed. This drive demand can be obtained by, e.g., a map prepared in advance. Then, an output demand of the engine 1 is calculated on the basis of the obtained drive demand and the vehicle speed, and a target engine revolution to output the output demand at minimum fuel consumption is obtained using the map. Further, the output of the motor generator 14 (i.e., torque×revolution frequency) is controlled to approximate an actual engine revolution to the target engine revolution where the fuel consumption is preferable. At the same time, an opening degree of the electronic throttle valve of the engine 1 and so on are controlled to approximate an actual engine output to a target engine output. Thus, the driving condition of the engine 1 can be controlled in line with an optimum fuel economy curve by controlling the speed change ratio of the power distribution mechanism 8.

As explained above, the control of transmitting the torque of the motor generator 2 to the wheel 3 through the transmission 7 by driving the motor generator 2 as a motor can also be carried out. That is, in case of generating a driving force by transmitting the torque to the wheel 3, at least one of the torques of the engine 1 and the motor generator 2 can be transmitted to the wheel 3. For this purpose, it is judged which torques of those prime movers are to be transmitted to the wheel 3, or both torques are to be transmitted to the wheel 3, on the basis of the signals and data inputted to the electronic control unit 38.

On the other hand, in case the vehicle Ve is coasting, kinetic energy of the vehicle Ve is transmitted to the engine 1 through the transmission 7 and the power distribution mechanism 8. Consequently, an engine brake is established. It is also possible to generate a regenerative braking force using the motor generator 2, by transmitting a part of the kinetic energy transmitted to the input rotary member 29 when the vehicle Ve is coasting to the motor generator 2. The resultant electric power can be stored in the electric storage device 33. This engine brake (i.e., power source braking) may also be applied by increasing the (total) speed change ratio under the manual mode.

As explained above, the gear stage of the transmission 7 is set according to the running condition of the vehicle Ve such as a vehicle speed and an output demand (i.e., an opening degree of an accelerator). When the vehicle Ve is running under any of the gear stages, a revolution frequency of the engine 1 is controlled to optimize the fuel consumption using the power distribution mechanism 8 functioning as a continuously variable transmission unit. Specifically, such control is carried out by controlling a revolution frequency of the first motor generator 14 functioning as a motor or a generator. In case a signal demanding the engine brake is outputted, more specifically, in case a downshift signal is outputted by a manual operation when such control of the speed change ratio on the basis of the running condition is being carried out (i.e., under the first speed change mode), a below-mentioned speed change control (i.e., the second speed change mode) is carried out.

Figure 1:
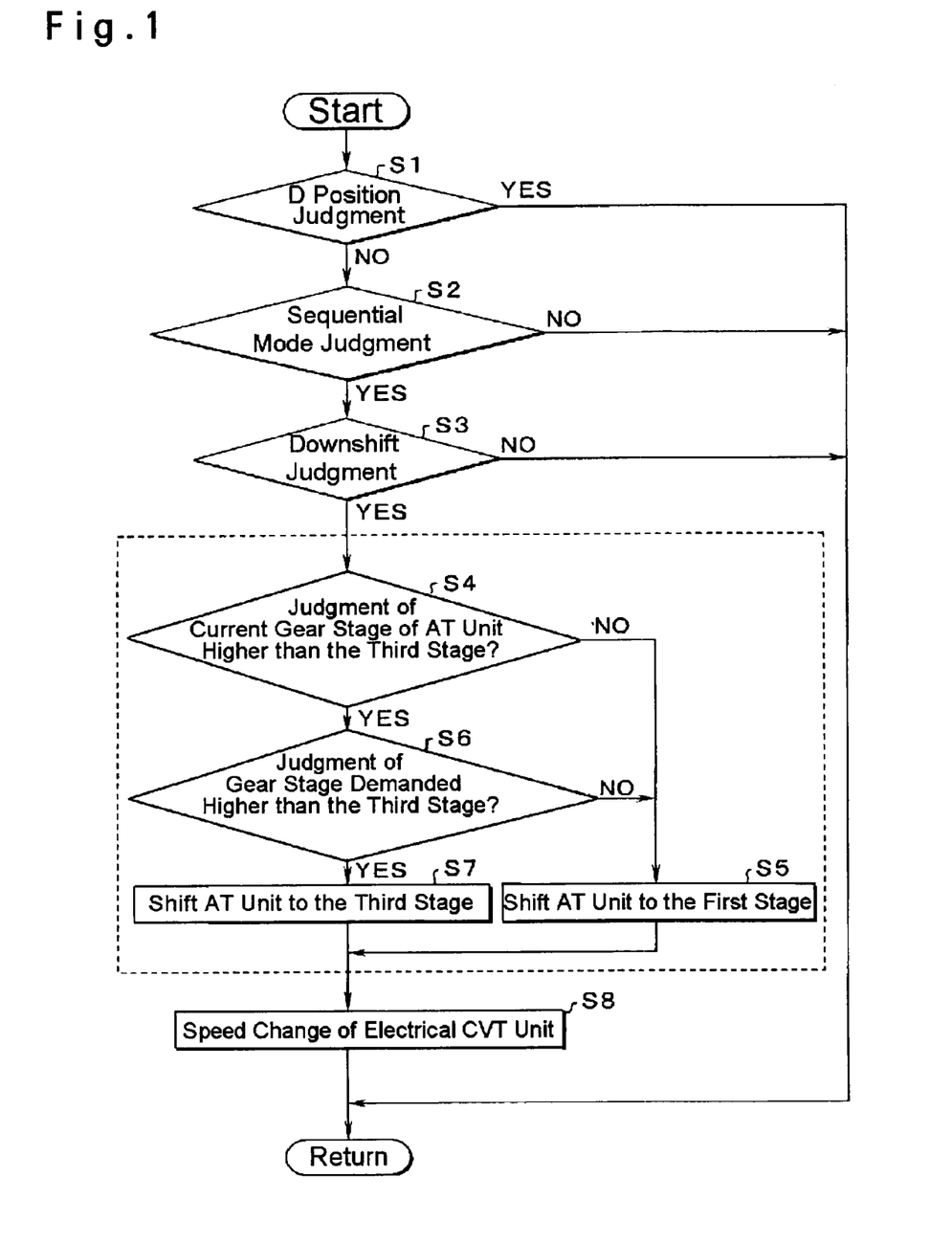
FIG. 1 is a flowchart explaining one example of a speed change control carried out by the control system of the invention.

FIG. 1 is a flowchart explaining one example of the above-mentioned control. First of all, it is judged whether or not the shift position is in the Drive position (D) (at Step S1). In case the answer of Step S1 is YES, a so-called automatic transmission control according to the running condition of the vehicle Ve is carried out, therefore, the routine is returned without carrying out the control shown in FIG. 1. To the contrary, in case the answer of Step S1 is NO, it is judged whether or not a sequential mode (i.e., the second speed change mode) is selected (at Step S2). The sequential mode is a speed change mode wherein the upshifting and the downshifting are executed by a manual operation. That is, the sequential mode corresponds to the manual mode. This judgment can be made on the basis of a signal outputted by moving the shift lever 43 of the shifting device 42 to the Manual position (M).

In case the answer of Step S2 is NO, the routine is returned without carrying out any particular control. To the contrary, the sequential mode is selected so that the answer of Step S2 is YES, a downshift judgment is carried out (at Step S3). Namely, it is judged whether or not a downshift operation is executed. This judgment can be made on the basis of a signal outputted by moving the shift lever 43 of the shifting device 42 to the downshift position. In case the downshift operation is not carried out so that the answer of Step S3 is NO, the routine is returned without carrying out any particular control. To the contrary, in case the downshift operation is carried out so that the answer of Step S3 is YES, it is judged whether or not the gear stage set in the transmission (i.e., AT unit) 7 is higher than the third stage (at Step S4).

In case the current gear stage of the transmission 7 is lower than the third stage, namely, in case the answer of Step S4 is NO, the transmission 7 is shifted to the first stage (at Step S5), and the routine is returned. That is, this speed change is carried out on the basis of the output of the downshift signal under the sequential mode regardless of the running condition of the vehicle Ve. Therefore, the gear stage of the transmission 7 is limited to the 1$^{st}$ speed at this step. To the contrary, in case the current gear stage of the transmission 7 is higher than the third stage so that the answer of Step S4 is YES, it is judged whether or not the gear stage (i.e., total speed change ratio) demanded by the downshift signal is higher than the third stage (at Step S6).

In case the answer of Step S6 is NO, the routine advances to aforementioned Step S5 to limit the gear stage of the transmission 7 by shifting the gear stage to the first stage. To the contrary, in case the gear stage higher than the third stage is demand so that the answer of step S6 is YES, the gear stage of the transmission 7 is set to the third stage (at Step S7). That is, the gear stage of the transmission 7 settable under the sequential mode is limited to the first and the third stages. After any of controls at steps S5 and S7 is carried out, the speed change ratio of the continuously variable transmission unit (i.e., the electrical CVT unit) 11 is set to approximate the total speed change ratio to the speed change ratio demanded by the manual operation (at Step S8).

Figure 2:
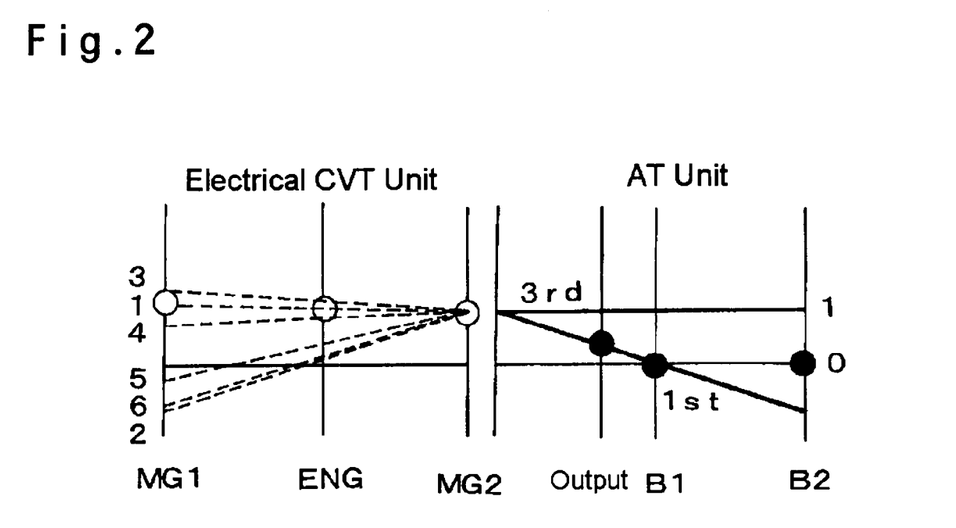
FIG. 2 is nomographic diagram of the drive unit illustrated in FIG. 7 in case of applying an engine brake by limiting a gear stage of a transmission to a first stage and a third stage.

FIG. 2 is a nomographic diagram of the case in which the control of FIG. 1 is applied to the drive unit shown in FIG. 7. As explained above, the gear stage of the transmission (i.e., AT unit) 7 is limited to the first and the third stages according to the running condition, more specifically, to the speed of the vehicle Ve. Those gear stages of the case in which the revolution frequency of the input member is constant are represented by two solid lines in the right side of FIG. 2. On the other hand, the speed change ratio of the power distribution mechanism (i.e., the electrical CVT unit) 8 is controlled stepwise to set the total speed change ratio in six forward stages. Those six stages are represented by the six broken lines in the left side of FIG. 2. Here, FIG. 2 shows an example, in which the first stage is set by engaging a brake B1, the second stage is set by engaging a brake B2, and the speed change ratio is "1" at the third stage.

Under this speed change mode of applying an engine brake, a torque is applied to the ring gear 11 connected with the input element of the transmission 7, in the direction to halt the rotation thereof. That is, the second motor generator (MG2) 2 is used as a generator to apply a negative torque to the rotary member 29, and the first motor generator (MG1) 14 is used as a motor by feeding electric power from the second motor generator (MG2) 2 or the electric storage device 33.

Figure 3:
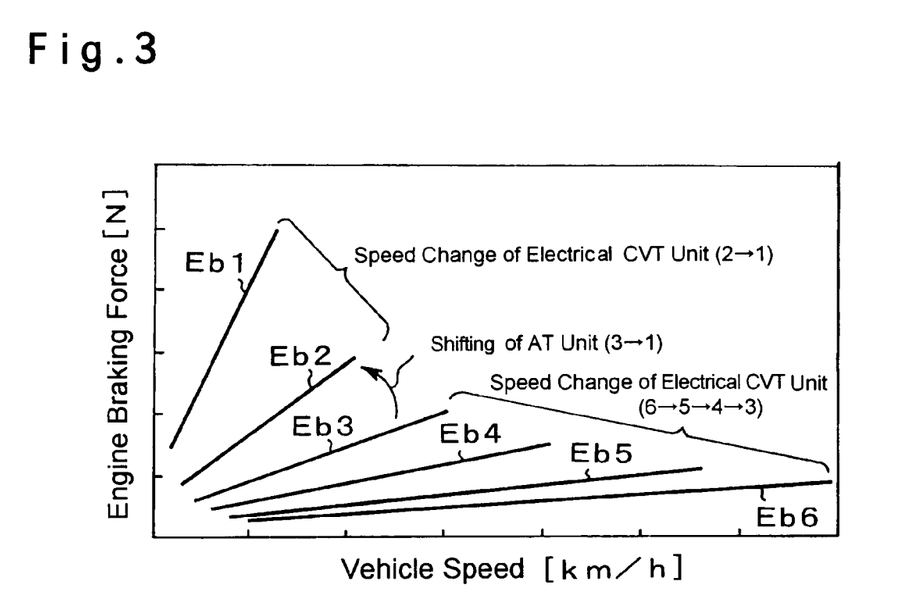
FIG. 3 is a diagram individually showing engine braking forces according to vehicle speeds from the first stage to the sixth stage.

FIG. 3 shows power source braking forces (i.e., engine braking forces). In FIG. 3, the lines Eb1, Eb2, Eb3, Eb4, Eb5 and Eb6 represent engine braking forces at the six forward stages of the transmission 7, and reference numerals represent gear stages. According to the above-mentioned speed change control carried out by the control system of the invention, despite the fact that the gear stages of the transmission 7 is limited to the first and the third stages under the speed change mode to apply an engine brake, the six forward gear stages are set for the total speed change ratio by controlling the speed change ratio of the power distribution mechanism 8. Those speed change ratios are identical to the total speed change ratios set by switching the gear stage of the transmission 7 between the first and the third stages. This means that the engine braking forces to be obtained are also identical.

Thus, according to the speed change control carried out by the control system of the invention, the gear stage of the transmission 7 is switched only between the first and the third stages. For this reason, frequency of the speed change operation associated with the switching operation of the frictional engagement devices such as the clutch and the brake can be reduced. In other words, the frequency of complicated speed change controls can be reduced. Moreover, since a desired speed change ratio can be set by controlling the speed change ratio of the power distribution mechanism 8, the response of the speed change operation can be improved. Specifically, in case the engine brake is demanded, delay in the initial phase of the engine brake can be solved or minimized. As a result, uncomfortable feeling at the manual downshifting can be eliminated.

Figure 4:
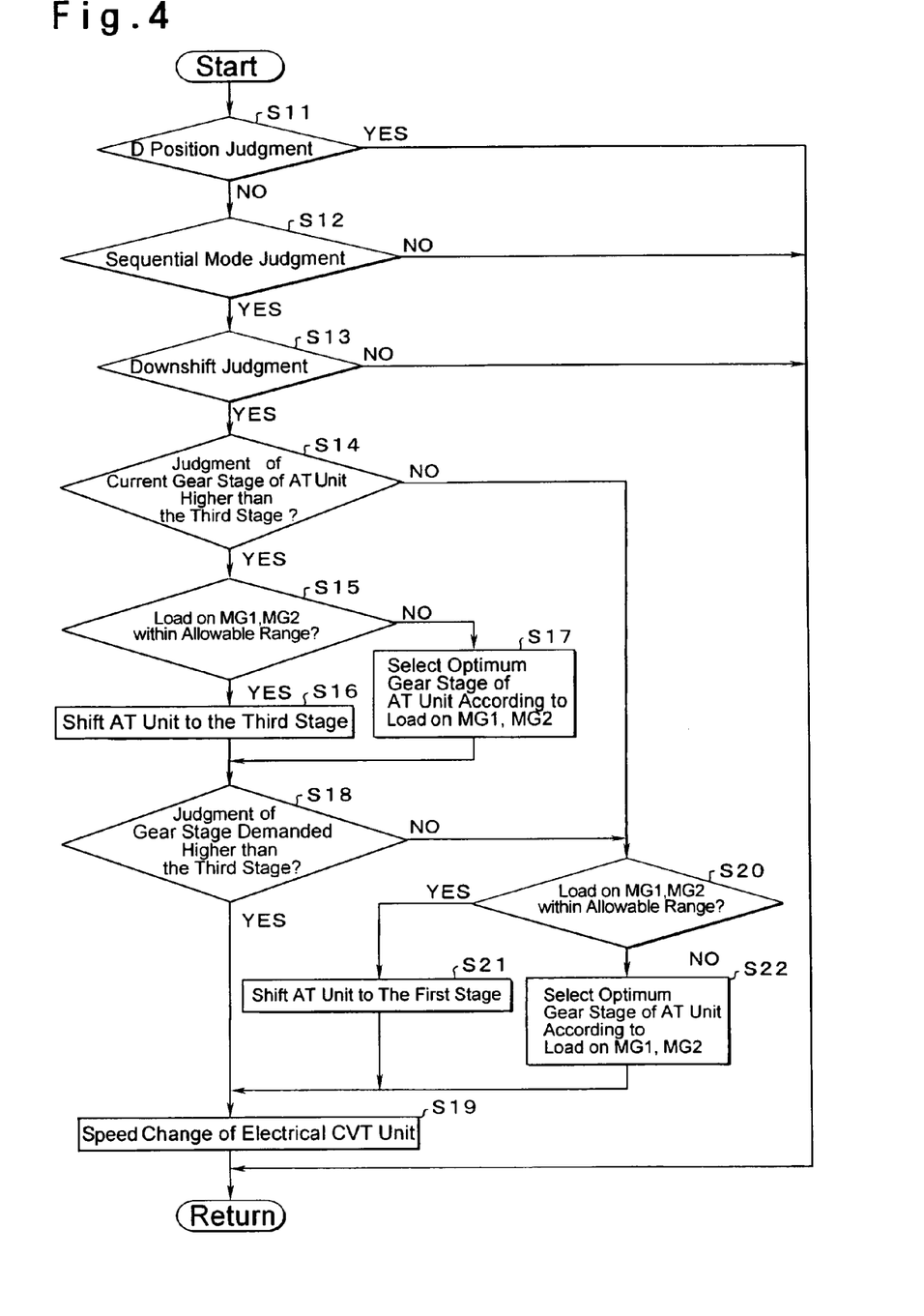
FIG. 4 is a flowchart explaining a control example of limiting the gear stages according to a thermal load of the motor generator.

As explained above, the number of the gear stages of the transmission 7 is limited under the speed change mode to apply an engine brake. Therefore, revolution frequencies of the motor generators 2 and 14 and torques thereof are increased so that the thermal load is raised. Therefore, the contents of the speed change control may be modified according to the thermal loads of the motor generators 2 and 14. A control example is shown in the flowchart of FIG. 4. According to the example shown in FIG. 4, first of all, it is judged whether of not the Drive position is selected (at Step S11). This Step S11 is a judgment step identical to Step S1 in FIG. 1. Therefore, the routine is returned in case the answer of Step S11 is YES. To the contrary, in case the answer of Step S11 is NO, it is judged whether of not the sequential mode is selected (at Step S12). This Step S12 is a judgment step identical to Step S2 in FIG. 1. Therefore, the routine is returned in case the answer of Step S12 is NO. To the contrary, in case the answer of Step S12 is YES, a downshift judgment is carried out (at Step S13).

This Step S13 is a judgment step identical to Step S3 in FIG. 1. Therefore, the routine is returned in case the answer of Step S13 is NO. To the contrary, in case the answer of Step S13 is YES, it is judged whether or not the gear stage set in the transmission 7 as the AT unit is higher than the third stage (at Step S14). In case the answer of Step S14 is YES, thermal loads on the motor generators (MG1 and MG2) 2 and 14 are determined (at Step S15). Specifically, at Step S15, it is judged whether or not the thermal loads, which is applied to the motor generators 2 and 14 in case the gear stage of the transmission 7 is shifted to the third speed under the current running condition, i.e., at the current the vehicle speed, are within a designed thermal rating of the motor generators 2 and 14. The thermal load can be calculated on the basis of the vehicle speed, the speed change ratio of the third stage and so on.

In case the answer of Step S15 is YES, the thermal load on the motor generators 2 and 14 are within the allowable range. Therefore, the gear stage of the transmission 7 is shifted to the third stage (at Step S16). To the contrary, in case any of the thermal loads on the motor generators 2 and 14 exceeds the allowable limit so that the answer of Step S15 is NO, an optimum gear stage of the transmission 7 is selected by calculating the optimum gear stage backwardly from the allowable thermal load (at Step S17).

Subsequent to the aforementioned Steps S16 and S17, it is judged whether or not the gear stage demanded is higher than the third stage (at Step S18). In case the answer of Step S18 is YES, a speed change operation of the power distribution mechanism 8 as an electrical CVT unit is carried out to set the demanded total speed change ratio (at Step S19). Specifically, the revolution frequency of the first motor generator 14 is controlled.

To the contrary, in case the answer of Step S14 is NO, that is, in case the current gear stage of the transmission 7 is lower than the third stage, it is judged whether or not the thermal loads on the motor generators (MG1 and MG2) 2 and 14 are within the allowable range if the transmission 7 is shifted to the first stage under the current running condition (at Step S20). That is, the fact that the thermal loads on the motor generators 2 and 14 are within the allowable range is a condition to set the first stage in the transmission 7. This judgment at Step S20 can be carried out in the same way as the aforementioned Step S15. In case the answer of Step S20 is YES, accordingly, the gear stage of the transmission 7 is shifted to the first stage (at Step S21). Then, the routine advances to Step S19 to execute a speed change of the power distribution mechanism 8.

To the contrary, in case the thermal loads on the motor generators 2 and 14 will exceed the allowable limit if the gear stage of the transmission 7 is shifted to the first stage so that the answer of Step S20 is NO, an optimum gear stage of the transmission 7 is selected by calculating the optimum gear stage backwardly from the allowable thermal load (at Step S22). The control carried out at this step is identical to that carried out at the aforementioned Step S17. Then, the routine advances to Step S19 to execute a speed change of the power distribution mechanism 8.

Thus, according to the control shown in FIG. 4, the number of the gear stages of the transmission 7 is limited when a downshifting is carried out under the manual mode to apply an engine brake. In this case, the gear stage is selected to prevent the thermal loads on the motor generators 2 and 14 from exceeding the allowable limit. For this reason, an energy loss and deterioration in durability of the motor generators 2 and 14 can be avoided.

Here, one of the advantages of the drive unit of a vehicle is that it is capable of improving the fuel economy by regenerating energy when the vehicle Ve is decelerating. Such advantage can also be utilized in the control carried out by the control system of the invention. In a control example shown in the flowchart of FIG. 5, a judgment for judging whether or not the Drive position is selected (Step S31), and a judgment for judging whether or not the sequential mode is selected (Step S32) are carried out sequentially, as the aforementioned control examples. That is, the routine is returned without carrying out any specific control if the Drive position is selected, and the sequential mode are not selected.

Figure 5:
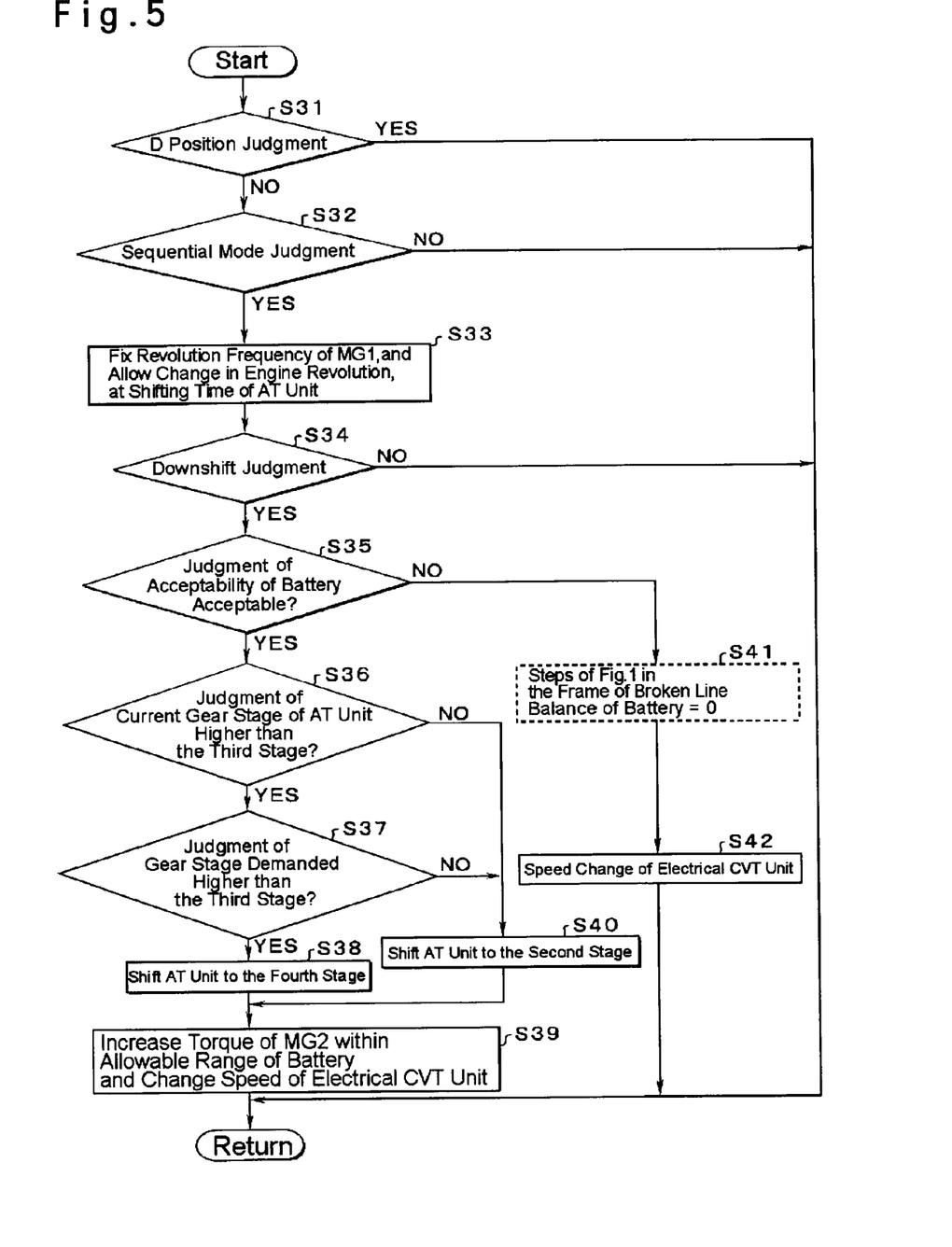
FIG. 5 is a flowchart explaining a control example of limiting the gear stages according to a state of charge of the electric storage device.

In case the sequential mode is selected so that the answer of Step S32 is YES, a control to fix a revolution frequency of the first motor generator (MG1) 14 in the power distribution mechanism 8 when the shifting operation of the transmission 7 is carried out, and to allow a revolution frequency of the engine 1 to be changed is carried out (at Step S33). This is a speed change operation carried out manually by a driver. For this reason, a change in a behavior, e.g., a change in the engine frequency resulting from the speed change operation will not bring any uncomfortable feeling. Additionally, an amount of regenerated energy is increased as explained later.

Then, a downshift judgment is carried out (at Step S34). This Step S34 is a judgment step identical to the aforementioned Steps S3 and S13. Therefore, in case the answer of Step S34 is NO, the routine is returned without carrying out any specific control. To the contrary, in case the answer of Step S34 is YES, a judgment of acceptability of the battery is carried out (at Step S35). Specifically, the second motor generator 2 functions as a generator when applying an engine brake, therefore, it is judged whether or not the electric storage device 33 can accept the electric power from the second motor generator 2 connected thereto. This judgment can be carried out by detecting a state of charge (SOC) of the electric storage device 33.

In case the answer of Step S35 is YES, it is judged whether or not the current gear stage of the transmission 7 is higher than the third stage (at Step S36). In case the gear stage of the transmission 7 is higher than the third stage so that the answer of Step S36 is YES, it is judged whether or not the gear stage demanded is higher than the third stage (at Step S37). In case the answer of Step S37 is YES, the gear stage of the transmission (i.e., the AT unit) 7 is shifted to the fourth stage (at Step S38). That is, the gear stage is shifted upwardly to the higher stage.

As a result, the revolution frequency of the ring gear 11 connected with the transmission 7 is lowered. In this case, if the revolution frequency of the first motor generator 14 is fixed, the revolution frequency of the engine 1 is lowered and the braking force of the engine 1 is thereby reduced. Therefore, a speed change control of the power distribution mechanism 8 functioning as an electrical CVT unit is carried out to ensure the engine braking force by increasing the torque of the second motor generator 2 within the allowable range of the electric storage device 33, and also to charge the electric storage device 33 by increasing the amount of generation (at Step S39). Here, the electric power to be stored in the electric storage device 33 is a surplus of the electric power supplied from the second motor generator 2 to the first motor generator 14.

To the contrary, in case the current gear stage of the transmission 7 is lower than the third stage so that the answer of Step S36 is NO, the gear stage of the transmission 7 is shifted to the second stage (at Step S40). As explained above, under the manual mode to apply an engine brake, the gear stage of the transmission 7 is basically shifted to the first stage in case the current gear stage is lower than the third stage. Therefore, the gear stage is shifted to the next upper stage in case of charging the electric storage device 33. Then, in this state of things, the routine advances to Step S39 to carry out the speed change control by the power distribution mechanism 8. As a result, the engine braking force is ensured by raising the torque of the second motor generator 2 and the electric storage device 33 is charged within the allowable range.

In case the answer of the aforementioned Step S35 is NO, specifically, in case the electric storage device 33 can not accept the electric power, the controls of Steps S4 to S7 shown in FIG. 1 are carried out (at Step S41). Then the speed change operation of the power distribution mechanism 8 corresponding to the continuously variable transmission unit (i.e., the electrical CVT unit) is carried out to achieve the total speed change ratio demanded (at Step S42).

Specifically, the transmission 7 is set to the first or the third stage in accordance with the current running condition of the vehicle Ve, the gear stage demanded and so on. Moreover, the second motor generator 2 functions as a generator to regenerate energy and to generate the braking force together with the engine 1. Further, the electric power generated by the second motor generator 2 is fed to the first motor generator 14, and the first motor generator 14 is thereby operated as a motor. As a result, the first motor generator 14 functioning as a motor acts to lower the revolution frequency of the ring gear 11 of the power distribution mechanism 8.

Thus, the number of the gear stages of the transmission 7 corresponding to the geared transmission unit is limited also in the control shown in FIG. 5. For this reason, the speed change operation can be carried out in good response in case the downshifting is demanded to apply an engine brake. Also, the frequency to carry out complicated controls, specifically, the frequency of an engaging and a releasing operation of the frictional engagement devices can be reduced. Further, an engine braking force to be obtained is comparable to that of the case in which the number of the gear stages is not limited.

Figure 6:
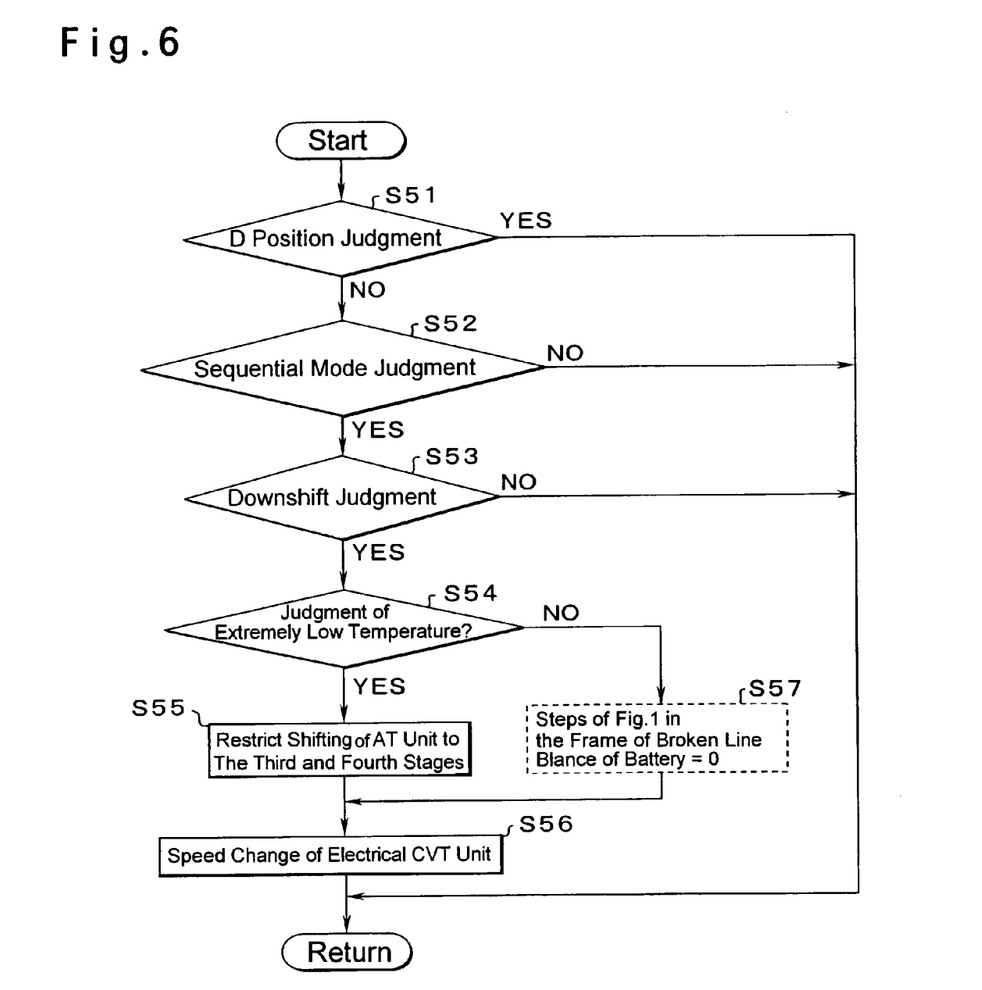
FIG. 6 is a flowchart explaining a control example of restricting the gear stages according to a temperature of oil or transmission.

As it is generally known, an oil temperature affects the response of the shifting operation of a geared transmission. According to the invention, therefore, a control on the basis of a temperature of the transmission 7 can also be carried out in addition to the aforementioned controls. FIG. 6 is a flowchart showing an example of such control, and as in the forgoing examples, a judgment of drive position (at Step S51), a judgment of sequential mode (at Step S52), and a judgment of downshifting (at Step S53) are carried out sequentially. The routine is returned without carrying out any specific control in case the Drive position is selected, in case the sequential mode is not selected, and in case the downshifting is not carried out.

In case the downshift operation is carried out under the sequential mode for carrying out a downshifting and an upshifting by a manual operation so that the answer of Step S53 is YES, it is judged whether or not a temperature of the transmission 7 or an oil temperature thereof is an extremely low temperature lower than a predetermined criterion temperature (at Step S54). The criterion temperature is a temperature where the viscosity of the oil start affecting the shifting operation, and it can be determined in advance from experiment or the like.

In case the answer of Step S54 is YES, predetermined gear stages of the transmission 7 are restricted (at Step S55). Here, the predetermined gear stages are the gear stages where the shifting control is comparatively difficult, specifically, gear stages to be achieved as a result of carrying out the speed change by controlling a plurality of the frictional engagement devices simultaneously. The gear stages achieved by this so-called "clutch-to-clutch" shifting are the third and the fourth stages in the transmission 7. Therefore, the third and the fourth stages are restricted in the example shown in FIG. 6. In case the third and the fourth stages are restricted, the gear stage of the low speed side such as the second speed is most likely set. Under the low speed gear stages, the revolution frequencies or the relative speed of the rotary members of the transmission 7 such as gears are increased. As a result, a temperature rise of the oil is promoted by a friction between the rotary members and agitation of the oil. For this reason, the restriction of the gear stages can be cancelled promptly.

At the aforementioned Step S55, the predetermined gear stages are thus restricted so that the gear stage other than the predetermined gear stage is set. In this condition, a speed change operation of the power distribution mechanism 8 functioning as an electrical CVT unit is carried out (at Step S56). On the other hand, in case the detected temperature is higher than the criterion temperature so that the answer of Step S54 is NO, the aforementioned controls of Steps S4 to S7 shown in FIG. 1 are carried out (at Step S57). Then a speed change operation of the power distribution mechanism 8 functioning as a continuously variable transmission unit (or an electrical CVT unit) is carried out (at Step S 56).

Here will be briefly described the relations between the aforementioned specific example and this invention. The functional means for carrying out the controls of the aforementioned Steps S5, S7, S16, S21, S38 and S40 correspond to the gear stage limiting means of the invention; the functional means for carrying out the controls of the aforementioned Steps S38 and S40 correspond to the gear stage selecting means of the invention; the functional means for carrying out the control of the aforementioned Step S35 corresponds to the state of charge determining means of the invention; the functional means for carrying out the control of the aforementioned Steps S38 and S40 correspond to the charge expediting means of the invention; the functional means for carrying out the control of the aforementioned Step S54 corresponds to the temperature detecting means of the invention; and the functional means for carrying out the control of the aforementioned Step S55 corresponds to the high speed stage restricting means of the invention.

The present invention should not be limited to the specific example as thus far described. The aforementioned electrically controlled speed change unit may be a unit capable of controlling the speed change ratio electrically, the continuously variable transmission unit should not limited to the unit having a gear mechanism for performing a differential action and it may be a unit capable of varying the speed change ratio continuously. Also, the mechanically controlled speed change unit may be a unit capable of shifting the gear stage mechanically, and the geared transmission unit may be a unit capable of setting a plurality of gear stages stepwise, e.g., a speed change unit composed mainly of a plurality of planetary gear mechanisms, and a speed change unit which comprises a plurality of gear pairs and in which a gear stage is set by selecting the gear pairs.

INDUSTRIAL APPLICABILITY

This invention can be utilized in the field of manufacturing and repairing a vehicle such as a car, and in the field of manufacturing and processing parts of a vehicle.

The invention claimed is:

1. A control system for a drive unit of a vehicle, which has an electrically controlled speed change unit electrically controlling a speed change ratio thereof governed by an input revolution and an output revolution, and a mechanically controlled speed change unit mechanically changing a gear stage thereof governed by an input revolution and an output revolution; and in which a speed change mode can be selected from a first speed change mode wherein a total speed change ratio governed by the speed change ratio of the electrically controlled speed change unit and the gear stage of the mechanically controlled speed change unit is set on the basis of a running condition of a vehicle, and a second speed change mode wherein the total speed change ratio is set on the basis of a signal for applying a power source braking, the control system comprising:
a gear stage limiting means for reducing a number of settable gear stages of the mechanically controlled speed change unit in case the second speed change mode is selected;
an electric storage device storing mechanical energy resulting from running of the vehicle in the form of electric power;
an electric motor to which the electric power is fed from the electric storage device, and which outputs power for running;
a state of charge determining means for determining a state of charge of the electric storage device in case the downshift signal for increasing the total speed change ratio is outputted to apply the power source braking; and
a charge expediting means for setting a high speed side gear stage of the mechanically controlled speed change unit in case the state of charge determining means determines that a charging capacity of the electric storage device is low, wherein
the total speed change ratio is set according to the gear stage of the mechanically controlled speed change unit set by the gear stage limiting means, and to the speed change ratio of the electrically controlled speed change unit, in case the second speed change mode is selected, so as to equalize an amount of charge and an amount of discharge of the electric storage device, in case the state of charge determining means determines that the charging capacity is high.

2. The control system for a drive unit of a vehicle as claimed in claim 1, wherein:
the mechanically controlled speed change unit and the electrically controlled speed change unit are connected in series so as to input power outputted from any one of those speed change units to the other one.

3. The control system for a drive unit of a vehicle as claimed in claim 1, wherein:
the electrically controlled speed change unit comprises an electric motor having a power generating function; and
the gear stage limiting means includes a gear stage selecting means for selecting the gear stage of the mechanically controlled speed change unit to limit thermal load on the power-generating electric motor within a predetermined allowable range, in case a downshift signal for increasing the total speed change ratio is outputted to apply the power source braking under the second speed change mode.

4. The control system for a drive unit of a vehicle as claimed in claim 1, further comprising:
a temperature detecting means for detecting a temperature of the mechanically controlled speed change unit; and
a gear stage restricting means for restricting predetermined gear stages of the mechanically controlled speed change unit in case the temperature detecting means detects an extremely low temperature of the mechanically controlled speed change unit.

5. The control system for a drive unit of a vehicle as claimed in claim 1, wherein:
the electrically controlled speed change unit includes a continuously variable transmission in which a speed change ratio thereof varies continuously, and
the mechanically controlled speed change unit includes a geared transmission in which a gear stage thereof changes stepwise.

6. The control system for a drive unit of a vehicle as claimed in claim 1, wherein:
the gear stage limiting means includes a means for reducing a number of settable gear stages of the mechanically controlled speed change unit in case the second speed change mode is selected, in comparison with that of the case in which the first speed change mode is selected.

7. The control system for a drive unit of a vehicle as claimed in claim 1, wherein:
the drive unit includes a hybrid drive unit, which comprises a plurality of prime movers, and in which powers outputted from those prime movers are distributed or synthesized to be outputted.

8. The control system for a drive unit of a vehicle as claimed in claim 1, wherein:
the electrically controlled speed change unit comprises a gear mechanism capable of performing a differential action by three rotary elements.

9. The control system for a drive unit of a vehicle as claimed in claim 8, wherein:
the gear mechanism includes a planetary gear mechanism comprising a sun gear, ring gear and a carrier as its rotary elements.

10. The control system for a drive unit of a vehicle as claimed in claim 9, further comprising:
an engine, which is connected with the carrier;
a first electric motor, which is connected with the sun gear; and
wherein an input shaft of the mechanically controlled speed change unit is connected with the ring gear.

11. The control system for a drive unit of a vehicle as claimed in claim 10, further comprising:
a second electric motor, which is connected with the input shaft of the mechanically controlled speed change unit.

12. The control system for a drive unit of a vehicle as claimed in claim 1, wherein:
the mechanically controlled speed change is constructed of a plurality of planetary gear mechanisms or a plurality of gear pairs.

13. The control system for a drive unit of a vehicle as claimed in claim 1, wherein:
the mechanically controlled speed change unit includes a transmission capable of setting six forward gear stages selectively.

14. A control method for a drive unit of a vehicle, which has an electrically controlled speed change unit electrically controlling a speed change ratio thereof governed by an input revolution and an output revolution, and a mechanically controlled speed change unit mechanically changing a gear stage thereof governed by an input revolution and an output revolution; and in which a speed change mode can be selected from a first speed change mode wherein a total speed change ratio governed by the speed change ratio of the electrically controlled speed change unit and the gear stage of the mechanically controlled speed change unit is set on the basis of a running condition of a vehicle, and a second speed change mode wherein the total speed change ratio is set on the basis of a signal for applying a power source braking, the vehicle further including an electric storage device storing mechanical energy resulting from running of the vehicle in the form of electric power and an electric motor to which the electric power is fed from the electric storage device, and which outputs power for running, the control method comprising:
a gear stage limiting step of reducing a number of settable gear stages of the mechanically controlled speed change unit in case the second speed change mode is selected;
a state of charge determining step of determining a state of charge of the electric storage device in case the downshift signal for increasing the total speed change ratio is outputted to apply the power source braking; and
a charge expediting step of setting a high speed side gear stage of the mechanically controlled speed change unit, in case a charging capacity of the electric storage device is determined as low at the state of charge determining step, wherein
the total speed change ratio is set according to the gear stage of the mechanically controlled speed change unit set at the gear stage limiting step, and to the speed change ratio of the electrically controlled speed change unit, in case the second speed change mode is selected, so as to equalize an amount of charge and an amount of discharge of the electric storage device, in case the charging capacity is determined as high at the state of charge determining step.

15. The control method for a drive unit of a vehicle as claimed in claim 14, wherein:
the electrically controlled speed change unit comprises a first electric motor having a power generating function; and
the gear stage limiting step includes a gear stage selecting step of selecting the gear stage of the mechanically controlled speed change unit to limit thermal load on the electric motor within a predetermined allowable range, in case a downshift signal for increasing the total speed change ratio is outputted to apply the power source braking under the second speed change mode.

16. The control method for a drive unit of a vehicle as claimed in claim 14, further comprising:
a temperature detecting step of detecting a temperature of the mechanically controlled speed change unit; and
a gear stage restricting step of restricting predetermined gear stages of the mechanically controlled speed change unit in case an extremely low temperature of the mechanically controlled speed change unit is detected at the temperature detecting step.

17. The control method for a drive unit of a vehicle as claimed in claim 14, wherein:
the gear stage limiting step includes a step of reducing the number of settable gear stages of the mechanically controlled speed change unit in case the second speed change mode is selected, in comparison with that of the case in which the first speed change mode is selected.

18. A control system for a drive unit of a vehicle, which has an electrically controlled speed change unit electrically controlling a speed change ratio thereof governed by an input revolution and an output revolution, and a mechanically controlled speed change unit mechanically changing a gear stage thereof governed by an input revolution and an output revolution; and in which a speed change mode can be selected from a first speed change mode wherein a total speed change ratio governed by the speed change ratio of the electrically controlled speed change unit and the gear stage of the mechanically controlled speed change unit is set on the basis of a running condition of a vehicle, and a second speed change mode wherein the total speed change ratio is set on the basis of a signal for applying a power source braking, the control system comprising:
a gear stage limiting device for reducing a number of settable gear stages of the mechanically controlled speed change unit in case the second speed change mode is selected;
an electric storage device storing mechanical energy resulting from running of the vehicle in the form of electric power;
an electric motor to which the electric power is fed from the electric storage device, and which outputs power for running;
a state of charge determining means for determining a state of charge of the electric storage device in case the downshift signal for increasing the total speed change ratio is outputted to apply the power source braking; and
a charge expediting means for setting a high speed side gear stage of the mechanically controlled speed change unit in case the state of charge determining means determines that a charging capacity of the electric storage device is low, wherein
the total speed change ratio is set according to the gear stage of the mechanically controlled speed change unit set by the gear stage limiting means, and to the speed change ratio of the electrically controlled speed change unit, in case the second speed change mode is selected, so as to equalize an amount of charge and an amount of discharge of the electric storage device, in case the state of charge determining means determines that the charging capacity is high.

* * * * *